United States Patent [19]

Gadelle

[11] Patent Number: 5,091,129
[45] Date of Patent: Feb. 25, 1992

[54] METHOD FOR MANUFACTURING A FILTER CARTRIDGE

[75] Inventor: Claude Gadelle, Rueil Malmaison, France

[73] Assignee: Institut Francais Du Petrole, Rueil Malmaison, France

[21] Appl. No.: 459,279

[22] Filed: Dec. 29, 1989

[30] Foreign Application Priority Data

Dec. 30, 1988 [FR] France .................... 88 17600

[51] Int. Cl.$^5$ .................... B01D 27/02; B29L 31/14
[52] U.S. Cl. .................... 264/85; 55/498; 55/DIG. 5; 210/496; 210/503; 264/504; 264/122; 264/126; 264/320; 264/331.17; 264/DIG. 48; 264/268; 264/112; 526/90; 526/902
[58] Field of Search .................... 264/85, 87, 50, 109, 264/113, 504, 112, 122, 127, DIG. 48, 126, 41, 331.17, 268; 210/496, 504, 503, 502.1, 510.1; 55/316, DIG. 5, 498; 526/90, 902; 425/4 R

[56] References Cited

U.S. PATENT DOCUMENTS

| | | | |
|---|---|---|---|
| 2,539,768 | 1/1951 | Anderson | 210/496 |
| 2,746,608 | 5/1956 | Briggs | 210/496 |
| 3,217,715 | 11/1965 | Berger et al. | 55/316 |
| 3,259,677 | 7/1966 | Zwick | 264/127 |
| 3,474,600 | 10/1969 | Tobias | 210/496 |
| 3,485,909 | 12/1969 | Yagishita | 264/122 |
| 3,538,020 | 11/1970 | Heskett et al. | 264/122 |
| 3,642,970 | 2/1972 | Hagitani et al. | 264/126 |
| 3,914,358 | 10/1975 | Dixon et al. | 264/69 |
| 4,144,171 | 3/1979 | Krause | 210/496 |
| 4,451,633 | 5/1984 | Brownscombe et al. | 264/331.17 |
| 4,665,050 | 5/1987 | Degen et al. | 210/510.1 |
| 4,859,386 | 8/1989 | VanderBilt et al. | 264/113 |

FOREIGN PATENT DOCUMENTS

56-38248 4/1981 Japan .................... 264/50

Primary Examiner—Jeffery Thurlow
Assistant Examiner—Mathieu Vargot
Attorney, Agent, or Firm—Antonelli, Terry Stout & Kraus

[57] ABSTRACT

A method for manufacturing a filter cartridge by polymerization of a polyethylene hydrocarbon with granular elements are set forth. The method involves the preparation of a mixture comprising the hydrocarbon and the granular elements, then introduction of the mixture into a mold which is formed by a first porous wall and a second porous wall, these walls being connected to a jacket, the introduction of the mold in an oven so as to raise the temperature of the mixture and by a thermal polymerization reaction to transform the hydrocarbon into a material binding the granular elements of the mixture, the assembly of the material and granular elements then forming a cartridge, and injection of a chemically inert gaseous composition into the mold through one of the walls to impart fluid permeability to the cartridge.

9 Claims, 1 Drawing Sheet

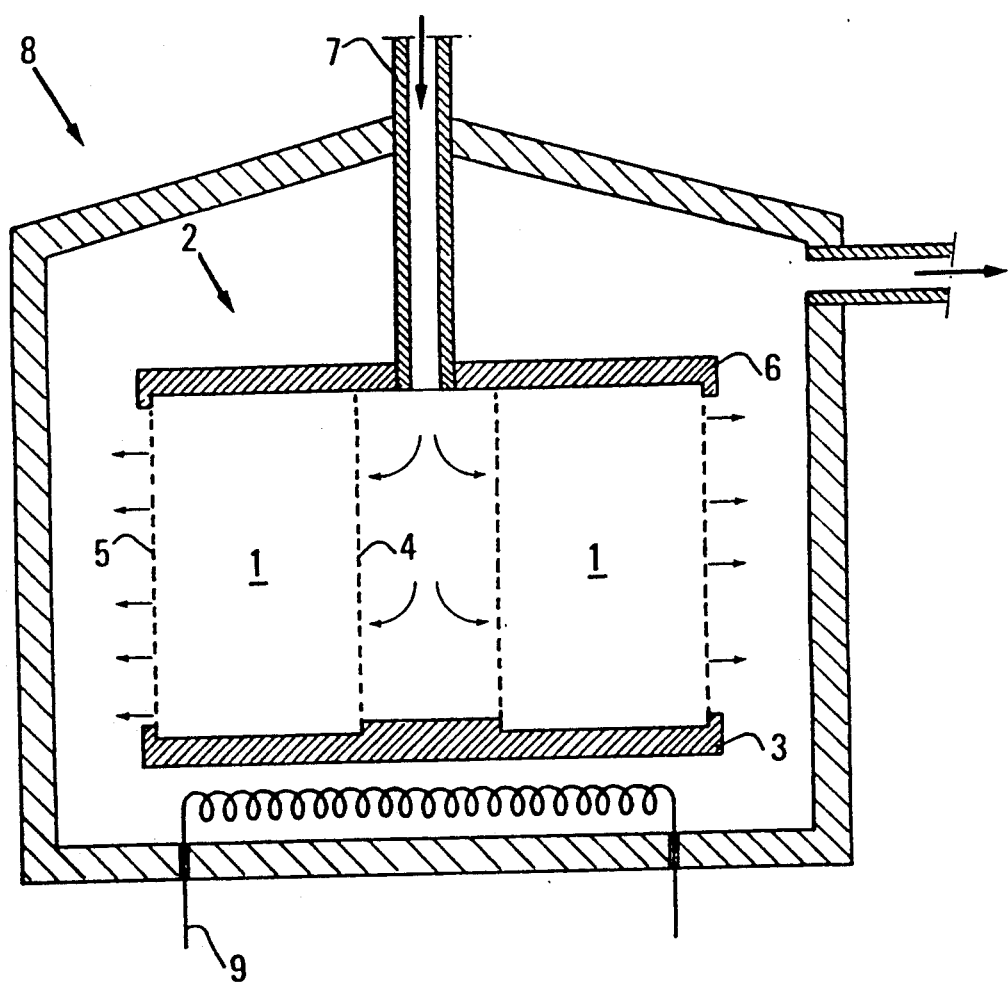

METHOD FOR MANUFACTURING A FILTER CARTRIDGE

BACKGROUND OF THE INVENTION

The present invention relates to a method of manufacturing a filter cartridge which can be used particularly when bringing in geological reservoirs containing oil or gas, for eliminating inflows of sand into the well passing through sandy formations which are little or not at all consolidated.

To bring in reservoirs, a mechanical means is used such as artificial screens with calibrated orifices, particularly liners or stacks of gravel having well defined granulometric distribution, depending on the dimensions of the sand grains of the geological formation through which the well passes. Such a method, which is difficult to put into practice, is often used for equipping new wells.

The filter cartridges produces by the method of the invention are much easier and less expensive to use than artificial screens or stacks of gravel, particularly because these cartridges are less fragile and the infrastructure for positioning them is reduced.

An object of the present invention is to provide a method of manufacturing filter cartridges which are very easy and reliable to use and which provides a product of high mechanical quality which is stable in time, with great permeability, excellent chemical inertia and high thermal stability, answering particularly the requirements of production or processing of oil or gas wells giving rise to sand inflows.

SUMMARY OF THE INVENTION

This result is attained, in accordance with the invention, with a method of manufacturing a filter cartridge by polymerization of a polyethylene hydrocarbon with granular elements. This method comprises the preparation of a mixture comprising said hydrocarbon and said granular elements, then the introduction of the mixture into a mold which is formed by a first porous wall and a second porous wall, these walls being connected together by a jacket, introduction of the mold in an oven so as to raise the temperature of the mixture and by a thermal polymerization reaction transform the hydrocarbon into a material binding the granular elements of the mixture, the assembly of material and granular elements forming the filter cartridge, and injection of a chemically inert gaseous composition into the mold through one of said walls which provide sufficient permeability of the filter cartridge.

By chemically inert gaseous composition is meant a gaseous composition which, under the operating conditions of the method, does not react with the polyethylene hydrocarbon. The injected gas may however, if required, contain traces of oxygen. The injected composition may be a natural gas, wet steam, nitrogen, a burnt gas or else a mixture of these gases, such particularly as a burnt gas with steam, or any other combination of steam and inert gas.

The injection of the gaseous composition provides fluid permeability of the block comprising the polymerized material and the granular elements, these fluids being water, oil or natural gas, nitrogen.

The temperature of the oven and the stay time of the mixture of polymerizable material and granular elements is adapted so that the degree of advance of the polymerization of the material is sufficient.

In a variant of the method, a filter cartridge is produced particularly of a cylindrical shape having a hollow central core, by using a first inner porous wall coaxial with or concentric to a second outer porous wall and a jacket comprising a bottom and a cover cooperating with said porous walls so as to form a hollow or annular cylindrical mold, by injecting the gaseous composition through one of the porous walls and removing the gaseous composition through the other one of the porous walls.

Preferably, injection takes place through the cover, then through the first porous wall which is inside the second outer porous wall.

Without departing from the scope of the present invention, the gaseous composition may be injected first of all through the second outer porous wall, granular elements impregnated with polymerizable material then through the the first inner porous wall.

The polyethylene hydrocarbon may advantageously be obtained by polymerization of dienes or trienes. This hydrocarbon may if required be diluted with an organic solvent. This polyethylene hydrocarbon may be advantageously polybutadiene.

The solvents used will be formed for example by hydrocarbons, such as benzene, toluene, xylene or a petroleum cut; the proportion of solvent will advantageously be between 0 and 50% so as to keep a sufficient mechanical quality.

the catalyst, added as required to the polyethylene hydrocarbon, may be at least an element from the group formed by barium, zirconium, cerium, lanthanum and the lanthanides, vanadium, maganese, iron, cobalt, zinc, nickel, lead and copper. The elements of such a catalyst will be used in the form of salts, such as carboxylates, naphtenates, sulfanates, octoates, . . . which can be mixed with the hydrocarbon. The proportion, in the solution, of each of the metals used in the catalyst will be less than 3% by weight and preferably between 0.007 and 2% by weight. The exact composition of the catalyst (metals used and metal proportions) will depend on the nature of the granular elements and on the manufacturing operating conditions (pressure, temperature, . . . ).

The catalyst may also contain an organic compound, such as a peroxide or any other compound permitting the formation of free radicals. To these peroxide compounds may if required be added a catalyst chosen from the group defined above formed by barium, zirconium, lanthanum, a lanthanide, vanadium, manganese, iron, cobalt, zinc, nickel, lead and copper. Among the peroxide compounds may be mentioned, by way of example, t-butyl hydroperoxide, di-t-butyl peroxide, cumene hydroperoxide.

The temperature of the mixture placed in the oven and the stay time in the oven must be sufficient for the hydrocarbon to polymerized efficiently and ensure cohesion of the granular elements. This temperature may be between 200° and 320° C. and advantageously between 250° and 300° C.

The gaseous composition injected may be cold or hot and its flow rate will be substantially between 100 and 1000 l/min per $m^2$ of sectional area of the mixture of granular elements and the hydrocarbon through which the composition is to be injected.

The granular elements may comprise at least one of the following materials, sand, particles such as glass, silica, alumina, carbide, for example silicon carbide, balls or microballs.

The mechanical quality of the surface of the cartridge may be adapted to manufacturing requirements, particularly the injection pressure, as well as to the requirements of use, such as the forces or shocks produced at the time of positioning the cartridges. For this, one at least of the porous walls serving for manufacturing the cartridge may form an integral part of the cartridge.

BRIEF DESCRIPTION OF THE DRAWINGS

The invention will be well understood and its advantages will be clear from the following description, illustrated by the accompanying FIG. 1 showing the manufacture of a hollow cylindrical filter cartridge 1 obtained by polymerization of a polyethylene hydrocarbon mixed with granular elements.

The hydrocarbon mixture to which a catalyst and granular elements are possibly added is introduced inside the mold 2 comprising a circular bottom 3 on which is positioned a first inner porous wall 4 and a second outer porous wall 5 which are covered with a circular cover 6 once the mold is filled.

The porous walls are obtained by perforation of tubes having a caliber adapted to the size of the granular elements.

The central portion of cover 6 is pierced with a hole and connected by a pipe 7 to a generator delivering a gaseous composition passing through mold 2 from the inside to the outside, by passing successively through the first porous wall and the second porous wall. The arrows shown in FIG. 1 indicate the flow of the inert gas in mold 2 and oven 8 in which the mold is placed, this oven comprising heating means having the reference 9.

The efficiency of the method of the invention is illustrated by the following tests, the characteristics of carrying out these tests having no limitative character.

TEST 1

A mixture of quarry sand having a grain size between 150 and 300 micrometers and polybutadiene is packed at ambient temperature in a mold of the type shown in FIG. 1 having an inner porous wall of a diameter of 7.6 cm, and an outer porous wall of a diameter of 17.8 cm, the height of the walls being 50 cm.

The temperature of the oven being controlled at 300° C., the a gaseous mixture containing 15% of nitrogen and 85% of steam is injected under a pressure of 100 kPa for 8 hours at a flowrate of 25 liters per minute.

The compression strength of the medium tested on a sample of the filter cartridge obtained after testing is 6 MPa.

TEST 2

This test is prepared like test 1 with a mixture of quarry sand and a composition containing 72% by weight of polybutadienes, 5% by weight of cobalt octoate and 3% by weight of zirconium octoate and 20% by weight of gasoline.

With the mold at 250° C., a composition of burnt gas containing 25% by volume of nitrogen and 15% by volume of carbon dioxide is injected for 10 hours at a pressure of 100 kPa at a rate of 25 liters per minute.

After the test, the compression strength is 5.5 MPa.

TEST 3

Using the same procedure as in test 2, a gaseous composition comprising 1/15 by volume of carbon dioxide, 2/15 of steam and 12/15 of nitrogen is injected at a pressure of 1 bar for 10 hours, the oven being controlled at 250° C.

Under these conditions, the compression strength of a sample taken from the cartridge obtained is 5 MPa.

TEST 4

The same procedure is used as in test 1, but using a diluted polybutadiene based composition, with 20% by weight of petroleum to which 0.3% by weight of cerium is added. The nitrogen is injected for 20 hours at a pressure of 100 kPa at a flowrate of 30 liters/minute, the oven being controlled at 240° C.

Under these conditions, the compression strength of a sample taken from the cartridge obtained is 10 MPa.

TEST 5

The same procedure is used as in example 1, but with a composition containing 78% by weight of polybutadiene, 20% by weight of petroleum and 2% by weight of di-t-butyl peroxide which is mixed with quarry sand.

The nitrogen is injected at a pressure of 100 kPa at a rate of 30 liters/minute for 60 hours, the temperature of the oven being controlled at 200° C.

Under these conditions, the compression strength of a sample taken from the cartridge obtained is 2.5 MPa.

What is claimed is:

1. A method of manufacturing a filter cartridge by polymerization of a polymerizable polyethylene hydrocarbon admixed with granular elements, said method comprising preparation of a mixture comprising said hydrocarbon, a catalyst, and said granular elements, then introduction of the mixture into a mold which is formed by a first porous wall and a second porous wall, said walls being connected to a jacket, introduction of said mold in an oven thereby raising the temperature of the mixture and effecting a thermal polymerization reaction to transform the hydrocarbon into a material binding the granular elements of the mixture, the assembly of the material and granular elements then forming a cartridge, and injection of a chemically inert gaseous composition into said mold through one of said porous walls to impart fluid permeability to said cartridge thereby forming said filter cartridge; said granular elements comprising at least one of sand, glass particles, silica particles, alumina particles and carbide particles and said catalyst contains at least one element selected from the group consisting of barium, zirconium, lanthanum, a lanthanide, vanadium, manganese, iron, cobalt, zinc, nickel, lead and copper.

2. The method as claimed in claim 1, wherein said first inner porous wall is coaxial with or concentric to said second outer porous wall, said jacket comprises a bottom and a cover cooperating with said porous walls so as to form a mold of annular shape and the gaseous composition is injected through said first porous wall and the gaseous composition is removed through said second porous wall.

3. The method as claimed in claim 1 or claim 2, wherein said polyethylene hydrocarbon is obtained by polymerization of dienes or trienes.

4. The method as claimed in claim 1 or claim 2, wherein said gaseous composition comprises at least one gas selected from the group consisting of natural gas, wet stream, nitrogen and a mixture of stream and burnt gas.

5. The method as claimed in claim 1 or claim 2, wherein the temperature of the mixture placed in the oven is between 200° and 300° C.

6. The method as claimed in claim 1, wherein the granular elements comprise silicon carbide particles.

7. The method as claimed in claim 1, wherein said material binding the granular elements comprises polybutadiene.

8. The method as claimed in claim 1, wherein the temperature of the mixture placed in the oven is between 250° and 300° C.

9. The method as claimed in claim 1, wherein at least one of the porous walls of the mold forms an integral part of the filter cartridge.

* * * * *